(12) United States Patent
Chen et al.

(10) Patent No.: US 11,347,523 B2
(45) Date of Patent: May 31, 2022

(54) UPDATED SHARED LIBRARY RELOADING WITHOUT STOPPING THE EXECUTION OF AN APPLICATION

(71) Applicant: International Business Machines Corporation, Armonk, NY (US)

(72) Inventors: Xiao Ling Chen, Beijing (CN); Zhan Peng Huo, Beijing (CN); Yong Yin, Beijing (CN); Dong Hui Liu, Beijing (CN); Qi Li, Beijing (CN); Jia Yu, Beijing (CN); Jiang Yi Liu, Beijing (CN); Xiao Xuan Fu, Wuhan (CN); Cheng Fang Wang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/089,847

(22) Filed: Nov. 5, 2020

(65) Prior Publication Data
US 2022/0137987 A1 May 5, 2022

(51) Int. Cl.
*G06F 9/445* (2018.01)
(52) U.S. Cl.
CPC ................ *G06F 9/44521* (2013.01)
(58) Field of Classification Search
None
See application file for complete search history.

(56) References Cited

U.S. PATENT DOCUMENTS

| 5,615,400 | A | | 3/1997 | Cowsar et al. |
| 5,822,787 | A | * | 10/1998 | Zucker ............... G06F 9/4486 711/213 |
| 6,442,752 | B1 | | 8/2002 | Jennings et al. |
| 6,665,735 | B1 | | 12/2003 | Tanaka et al. |
| 8,997,074 | B1 | | 3/2015 | Chen et al. |

(Continued)

FOREIGN PATENT DOCUMENTS

| CA | 2166302 A1 | 1/1995 |
| CN | 105279429 A | 1/2018 |

OTHER PUBLICATIONS

International Search Report; International Application No. PCT/IB2021/060126; International Filing Date: Nov. 2, 2021; dated Feb. 10, 2022; 10 pages.

*Primary Examiner* — Umut Onat
(74) *Attorney, Agent, or Firm* — Cantor Colburn LLP; Jeffrey Ingalls

(57) ABSTRACT

Techniques include executing a software program having a function call to a shared library and reloading the shared library without stopping execution of the software program. A global offset table (GOT) is updated responsive to resolving a link address associated with the function call. An entry in GOT included a link address field, an index field, and a resolved field, the updating including updating the index field with an affirmative value and marking the resolved field with an affirmative flag for the entry in the GOT. Responsive to reloading the shared library, the entry in the GOT is found having the affirmative value in the index field and the affirmative flag in the resolved field. An address value in the link address field is returned for the entry having the affirmative value in the index field, responsive to a subsequent execution of the function call to the shared library.

25 Claims, 15 Drawing Sheets

```
                                    1200
```

EXECUTE, BY A PROCESSOR, A SOFTWARE PROGRAM WHICH REQUIRES A FUNCTION CALL TO A SHARED LIBRARY 1202

RELOAD THE SHARED LIBRARY WITHOUT STOPPING EXECUTION OF THE SOFTWARE PROGRAM, THE SHARED LIBRARY HAVING BEEN UPDATED SUBSEQUENT TO THE EXECUTION OF THE SOFTWARE PROGRAM 1204

UPDATE A GLOBAL OFFSET TABLE (GOT) RESPONSIVE TO RESOLVING A LINK ADDRESS ASSOCIATED WITH THE FUNCTION CALL, AN ENTRY IN THE GOT COMPRISING A LINK ADDRESS FIELD, AN INDEX FIELD, AND A RESOLVED FIELD, THE UPDATING COMPRISING UPDATING THE INDEX FIELD WITH AN AFFIRMATIVE VALUE AND MARKING THE RESOLVED FIELD WITH AN AFFIRMATIVE FLAG FOR THE ENTRY IN THE GOT 1206

RESPONSIVE TO RELOADING THE SHARED LIBRARY WITHOUT STOPPING EXECUTION OF THE SOFTWARE PROGRAM, FIND THE ENTRY IN THE GOT HAVING THE AFFIRMATIVE VALUE IN THE INDEX FIELD AND THE AFFIRMATIVE FLAG IN THE RESOLVED FIELD 1208

RETURN AN ADDRESS VALUE IN THE LINK ADDRESS FIELD FOR THE ENTRY HAVING THE AFFIRMATIVE VALUE IN THE INDEX FIELD, RESPONSIVE TO A SUBSEQUENT EXECUTION OF THE FUNCTION CALL TO THE SHARED LIBRARY 1210

(56) References Cited

U.S. PATENT DOCUMENTS

| | | |
|---|---|---|
| 10,061,371 B2 * | 8/2018 | Geffin ................ H05K 7/20836 |
| 10,445,112 B2 * | 10/2019 | Sirajuddin .......... G06F 9/44521 |
| 2005/0010911 A1 | 1/2005 | Kim et al. |
| 2012/0011371 A1 | 1/2012 | Lee et al. |
| 2015/0033354 A1 | 1/2015 | Wichmann et al. |
| 2016/0274878 A1 | 9/2016 | Tallam et al. |
| 2018/0165075 A1 | 6/2018 | Gshwind et al. |
| 2018/0196652 A1 | 7/2018 | Gschwind et al. |
| 2018/0217851 A1 | 8/2018 | Sirajuddin |
| 2019/0340103 A1 | 11/2019 | Nelson et al. |

* cited by examiner

FIG. 11
Jump to *0x7ff9100* directly when bar is called again later.

| Linker@: 0x75fedbe4 |
|---|
| ... |
| resolve link |
| b @GOT+0x28 |
| ... |

| Unresolved Entry: | |
|---|---|
| 0 | num |
| 1 | bar |
| 2 | hook |
| ... | ... |

| Symbol Table: | |
|---|---|
| ... | var |
| 1 | bar |
| 2 | func_global |

| DLL Index: | |
|---|---|
| 0 | libstc.so | 0x7ff7700 |
| 1 | liba.so | 0x7ff9000 |
| ... | ... | ... |

| GOT (4-bytes → 8-bytes) | | | |
|---|---|---|---|
| 0x00 | 0x80000000 | -1 | False |
| 0x08 | 0x80000000 | -1 | False |
| 0x10 | 0x75fedbe4 | -1 | False |
| 0x18 | 0x80000000 | -1 | False |
| 0x20 | 0x80000000 | -1 | False |
| 0x28 | 0x7ff9100 | 1 | Ture |
| 0x30 | 0x80000000 | -1 | False |
| 0x38 | 0x80000000 | -1 | False |
| 0x40 | 0x80000000 | -1 | False |
| ... | ... | ... | ... |

502 → 504 → 506 → 508

| Code: liba.so |
|---|
| 0x7ff9100 |
| bar() { ... } |
| ... |

| Code: main.c → main.o |
|---|
| foo () |
| { |
| bar() |
| } |
| ... |

⇩ compile

| bar@PLT: |
|---|
| ... |
| b @GOT+0x28 |
| ... |

| 0x80000000 |
|---|
| ... |
| #goto linker |
| b @GOT+0x10 |
| ... |

UPDATED SHARED LIBRARY RELOADING WITHOUT STOPPING THE EXECUTION OF AN APPLICATION

BACKGROUND

The present invention generally relates to computer systems, and more specifically, to computer systems, computer-implemented methods, and computer program products to perform updated shared library reloading without stopping the execution of an application.

In computing, position-independent code or position-independent executable is a body of machine code that, being placed somewhere in the primary memory, executes properly regardless of its absolute address. The term absolute address refers to a numerical value that identifies a fixed location physically in real storage in terms of the number of bytes from the beginning, or in a peripheral device in terms of disks, sectors and bytes. Position-independent code is commonly used for shared libraries, so that the same library code can be loaded in a location in each program address space where it will not overlap any other uses of memory (for example, other shared libraries). A shared library or shared object is a file that is intended to be shared by executable files and further shared object files. Modules used by a program are loaded from individual shared objects into memory at load time or runtime, rather than being copied by a linker when it creates a single monolithic executable file for the program. Particularly, shared libraries are libraries that are loaded by programs when they start. When a shared library is installed properly, all programs that start afterwards automatically use the new shared library. Shared libraries can be statically linked during compile-time, meaning that references to the library modules are resolved and the modules are allocated memory when the executable file is created, or dynamically linked later.

When using shared libraries, issues or problems can arise when the shared library is updated. For example, when a program has been executed, there can be problems if source code in the shared library is updated, compiling options used are changed, and/or the search path is modified, even though positive-independent code is used. In such cases, users have to stop the execution or debugging of the program to reload the software program again in order to make the updated shared library take effect.

SUMMARY

Embodiments of the present invention are directed to performing updated shared library reloading without stopping the execution of an application. A non-limiting example computer-implemented method includes executing, by a processor, a software program which requires a function call to a shared library and reloading the shared library without stopping execution of the software program, the shared library having been updated subsequent to the execution of the software program. The computer-implemented method includes updating a global offset table (GOT) responsive to resolving a link address associated with the function call, an entry in the GOT comprising a link address field, an index field, and a resolved field, the updating comprising updating the index field with an affirmative value and marking the resolved field with an affirmative flag for the entry in the GOT. The computer-implemented method includes responsive to reloading the shared library without stopping execution of the software program, finding the entry in the GOT having the affirmative value in the index field and the affirmative flag in the resolved field. Also, the computer-implemented method includes returning an address value in the link address field for the entry having the affirmative value in the index field, responsive to a subsequent execution of the function call to the shared library.

In addition to one or more of the features described above or below, or as an alternative, further embodiments could include prior to updating the GOT, setting the link address field to a default value.

In addition to one or more of the features described above or below, or as an alternative, further embodiments could include prior to updating the GOT, marking the resolved field with a non-affirmative value if the resolved field previously contained the affirmative value.

In addition to one or more of the features described above or below, or as an alternative, further embodiments could include where the reloading of the shared library without stopping execution of the software program comprises resolving a new address for the shared library having been updated.

In addition to one or more of the features described above or below, or as an alternative, further embodiments could include where the updating of the GOT comprises replacing the default value with the new address in the link address field.

In addition to one or more of the features described above or below, or as an alternative, further embodiments could include where the address value in the link address field is the new address having been resolved for the shared library.

In addition to one or more of the features described above or below, or as an alternative, further embodiments could include where the shared library is initially loaded for the function call to the shared library during the executing of the software program, prior to the reloading of the shared library.

In addition to one or more of the features described above or below, or as an alternative, further embodiments could include perform reloading of an updated shared library without stopping execution of the software program/application.

In addition to one or more of the features described above or below, or as an alternative, further embodiments could include extending the size of the global offset table with a new library index field and a new address resolved flag field, to account for reloading the updated shared library.

A non-limiting example system includes a memory having computer readable instructions and one or more processors for executing the computer readable instructions. The computer readable instructions control the one or more processors to perform operations including executing a software program which requires a function call to a shared library, and reloading the shared library without stopping execution of the software program, the shared library having been updated subsequent to the execution of the software program. The operations include updating a global offset table (GOT) responsive to resolving a link address associated with the function call, an entry in the GOT comprising a link address field, an index field, and a resolved field, the updating comprising updating the index field with an affirmative value and marking the resolved field with an affirmative flag for the entry in the GOT. The operations include responsive to reloading the shared library without stopping execution of the software program, finding the entry in the GOT having the affirmative value in the index field and the affirmative flag in the resolved field. Also, the operations include returning an address value in the link address field for the entry having the affirmative value in the index field, responsive to a subsequent execution of the function call to the shared library.

A non-limiting example includes a computer program product comprising a computer readable storage medium having program instructions embodied therewith, the program instructions executable by a processor to cause the processor to perform operations including executing a software program which requires a function call to a shared library. The operations include reloading the shared library without stopping execution of the software program, the shared library having been updated subsequent to the execution of the software program. The operations include updating a global offset table (GOT) responsive to resolving a link address associated with the function call, an entry in the GOT comprising a link address field, an index field, and a resolved field, the updating comprising updating the index field with an affirmative value and marking the resolved field with an affirmative flag for the entry in the GOT. The operations include responsive to reloading the shared library without stopping execution of the software program, finding the entry in the GOT having the affirmative value in the index field and the affirmative flag in the resolved field. Also, the operations include returning an address value in the link address field for the entry having the affirmative value in the index field, responsive to a subsequent execution of the function call to the shared library.

A non-limiting example includes a computer-implemented method comprising reloading a shared library without stopping execution of a software program that calls the shared library. The computer-implemented method includes updating an index field with an affirmative value and marking a resolved field with an affirmative flag for an entry in a global offset table (GOT), responsive to resolving a link address to the shared library. The computer-implemented method includes responsive to reloading the shared library without stopping execution of the software program, finding the entry in the GOT having the link address resolved for the shared library.

A non-limiting example includes a system comprising a memory having computer readable instructions and one or more processors for executing the computer readable instructions. The computer readable instructions control the one or more processors to perform operations comprising reloading a shared library without stopping execution of a software program that calls the shared library. The operations include updating an index field with an affirmative value and marking a resolved field with an affirmative flag for an entry in a global offset table (GOT), responsive to resolving a link address to the shared library. The operations include responsive to reloading the shared library without stopping execution of the software program, finding the entry in the GOT having the link address resolved for the shared library.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 11 depicts a block diagram illustrating branching directly to the new address for the shared library when a function call is subsequently performed in accordance with one or more embodiments of the present invention;

DETAILED DESCRIPTION

One or more embodiments of the present invention perform reloading of an updated shared library without stopping execution of the target program/application. One or more embodiments of the present invention provide a technique to reload updated dynamic libraries called by a software program/application seamlessly when a debugger or other tools trigger a library reload action. According to one or more embodiments, the static linker is configured to extend the size of the global offset table (GOT) item with a new library index field and a new address resolved flag field. The debugger or other tools are configured to reload updated dynamic library and look through the library index field of the GOT, and then reset the link address (with a default value) and resolved flags (with a default value) stored in matched GOT items whose previous address resolved flag is TRUE. As such, the reset link address in the link address field makes the loader resolve the link address when the application programming interface (API) from the updated shared library is called later. One or more embodiments of the invention effectively reloads the updated shared dynamic library without stopping execution or debugging of software program/applications which call the API for the updated dynamic libraries. Accordingly, this beneficial technique not only helps users to resolve their question/request/input more quickly and efficiently, but also provides them with a way to perform more flexible testing and/or debugging.

One or more embodiments address the issue, occurring in contemporary techniques, that after an application is executed, if source code in the shared library is updated, compiling options used are changed, and/or the search path is modified, even though positive-independent code is used, users have to stop the execution or debugging of the software program/application to load the software program/application again in order to make the updated shared library take effect. The reason for stopping the software program/application is because the current loader cannot resolve the link address validly when the updated shared dynamic library is loaded with a different address during the execution of the software program/application. Such frequent restarting action during program/application development and bug location is troublesome for developers and wastes their time especially for programs/applications with very complicated (or long) source code. However, one or more embodiments of the invention provides a new innovative method to address this scenario, thereby introducing an effective way to reload the updated dynamic library seamlessly without halting or stopping the execution or debugging of the executing program/application.

Figure 1:
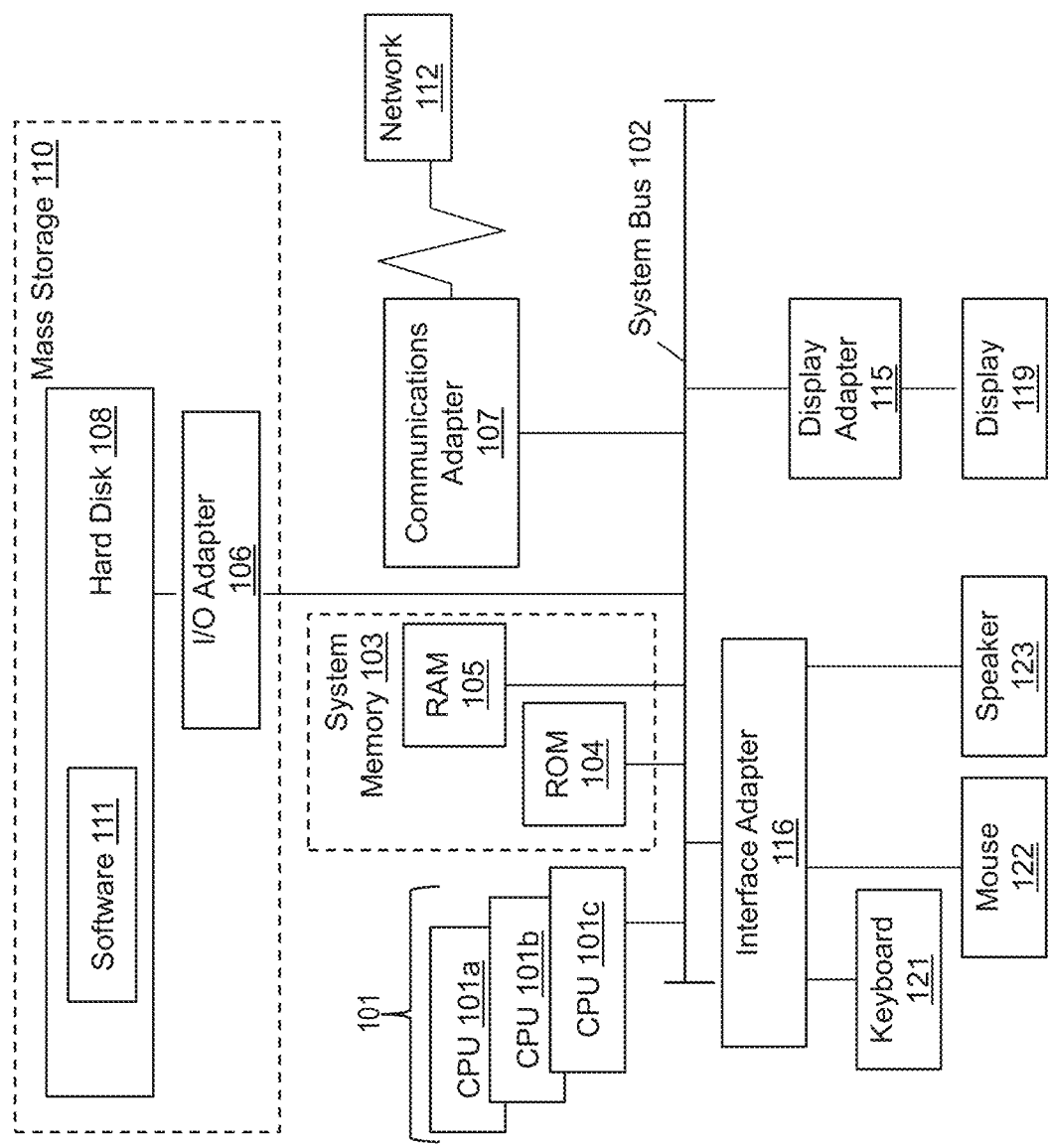
FIG. 1 depicts a block diagram of an example computer system for use in conjunction with one or more embodiments of the present invention.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
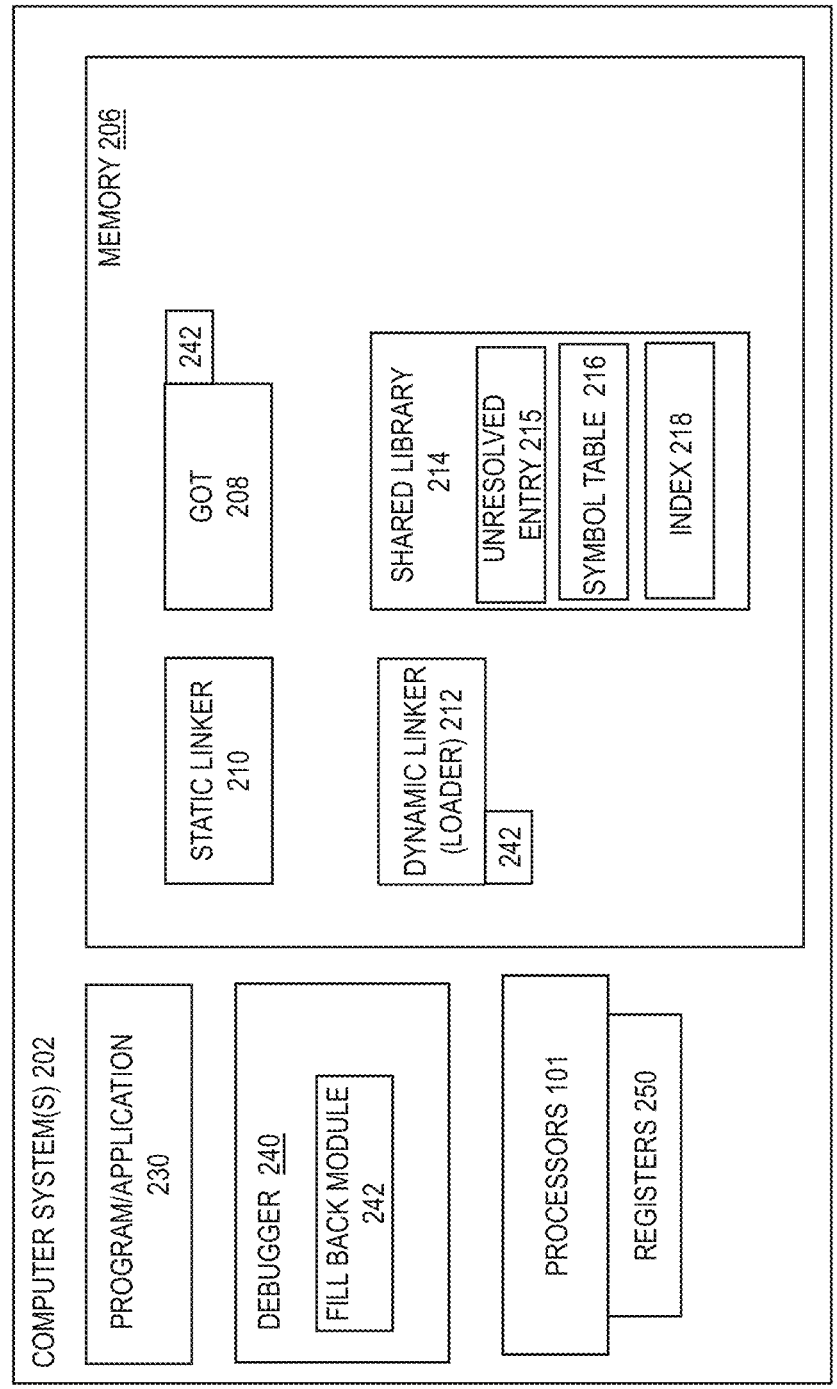
FIG. 2 depicts a block diagram of a system for reloading an updated shared library without stopping the execution of a software program/application in accordance with one or more embodiments of the present invention.

FIG. 2 is a block diagram of a system 200 for reloading an updated shared library 214 without stopping the execution of a software program/application in accordance with one or more embodiments of the present invention. FIG. 2 depicts one or more computers systems 202. For example, computer system 202 can be representative of numerous computers in a datacenter servicing various users. Elements of computer system 100 may be used in and/or integrated into computers system 202. One or more software programs/applications 230, one or more debuggers 240, one or more static linkers 210 and dynamic linkers 212, one or more GOTs 208, and one or more shared libraries 214 may utilize and/or be implemented as software 111 executed on one or more processors 101, as discussed in FIG. 1.

Software program/application 230 is executing on computer system 202, and software program/application 230 uses and/or requires access to shared library 214 as part of its execution. A shared library may have a special name called the "soname". The soname has the prefix "lib", the name of the library, the phrase ".so" followed by a period, and a version number that is incremented whenever the interface changes. A fully-qualified soname may include as a prefix the directory it is in. On a working system, a fully-qualified soname is simply a symbolic link to the shared library's "real name". The real name is the filename containing the actual library code.

In computing, a linker or link editor, such as a static linker 210 and a dynamic linker 212, is a computer system program that takes one or more object files (generated by a compiler or an assembler) and combines them into a single executable file, library file, or another "object" file. Computer programs, such as software program/application 230, typically are composed of several parts or modules. These parts/modules need not all be contained within a single object file, and in such cases, refer to each other by means of symbols (e.g., in a symbol table 216) as addresses into other modules, which are mapped into memory addresses (of memory 206) when linked for execution. Typically, an object file can contain three kinds of symbols: defined "external" symbols, sometimes called "public" or "entry" symbols, which allow it to be called by other modules; undefined "external" symbols, which reference other modules where these symbols are defined; and local symbols used internally within the object file to facilitate relocation. Relocations are entries in binaries that are left to be filled in later, at link time by static linker (binder) or at runtime by dynamic linker (loader).

Many operating system environments allow dynamic linking (e.g., using dynamic linker 212), which defers the resolution of some undefined symbols until a program (e.g., software program/application 230) is run. This means that the executable code of software program/application 230 still contains undefined symbols, plus a list of objects or libraries (e.g., one or more shared libraries 214) that will provide definitions for these undefined symbols. A dynamically linked program (e.g., software program/application 230) contains a small, statically linked function that is called when the program starts. This static function maps the link library (e.g., one or more shared libraries 214) into memory 206 and runs the code that the function contains. The dynamic linker 212 determines what are all the shared dynamic libraries which the program requires along with the names of the variables and functions needed from those libraries by reading the information contained in sections of the shared library. After which, dynamic linker 212 maps the shared libraries into the middle of virtual memory and resolves the references to the symbols contained in those shared libraries. The software program does not know where in the memory 206 these shared libraries (e.g., one or more shared libraries 214) are actually mapped. The shared libraries are compiled into position-independent code (PIC), that can run at any address in memory.

On the other hand, static linking (e.g., using static linker 210) is the result of the linker copying all library routines used in software program/application 230 into the executable image/file. This may require more disk space and memory 206 than dynamic linking, but is more portable, since the program does not require the presence of the shared library on the system where it runs. For example, when one clicks the executable (.exe) file of the program and it starts running, all the necessary contents of the binary file have been loaded into the process's virtual address space. However, most programs also need to run functions from the system's shared libraries, and these library functions also need to be loaded. In the simplest case, the required library functions are embedded directly in the program's executable binary file. Such a program is statically linked to its libraries, and statically linked executable codes can commence running as soon as they are loaded.

A debugger 240 or debugging tool is a computer program used to test and debug other programs such as software program/application 230. Debugger 240 is configured to run software program/application 230 under controlled conditions that permit the programmer to track its operations in progress and monitor changes in computer resources (such as, for example, memory areas used by the program or the computer's operating system) that may indicate malfunctioning code in software program/application 230. Debugger 240 has the ability to run or halt the program at specific points, display the contents of memory, CPU registers (e.g., registers 250), or storage devices (such as disk drives), and modify memory or register contents in order to enter selected test data that might be a cause of faulty program execution.

Computer system 202 includes a global offset table (GOT) 208 which is a section of a computer program's (executables and shared libraries) memory used to enable computer program code (e.g., compiled as an ELF file) to run correctly, independent of the memory address where the program's code or data is loaded at runtime. GOT 208 maps symbols in programming code to their corresponding absolute memory addresses to facilitate position-independent code (PIC) and position-independent executables (PIE) which are loaded to a different memory address each time the software program is started. The runtime memory address, also known as absolute memory address of variables and functions, is unknown before the program is started when PIC or PIE code is run so the runtime memory address cannot be hardcoded during compilation by a compiler. The GOT can be represented as the .got and .got.plt sections in files (e.g., an ELF file), which are loaded into the program's memory at startup. For example, the operating system's dynamic linker is used to update the global offset table relocations (symbol to absolute memory addresses) at program startup or as symbols are accessed. GOT 208 is the mechanism that allows shared libraries (e.g., .so) to be relocated to a different memory address at startup and avoid memory address conflicts with the main program or other shared libraries. GOT 208 is a table of addresses residing in the data section. GOT 208 converts position-independent address calculations to absolute locations. Procedure linkage table (PLT) (not shown) is a table that redirects position-independent function calls to absolute locations. The link editor cannot resolve execution transfers such as function calls between different dynamic objects. So, the link editor arranges to have the program transfer control to entries in the procedure linkage table. The runtime linker thus redirects the entries without compromising the position-independence and shareability of the program's text. Executable files and shared object files can have separate procedure linkage tables.

Figure 3:
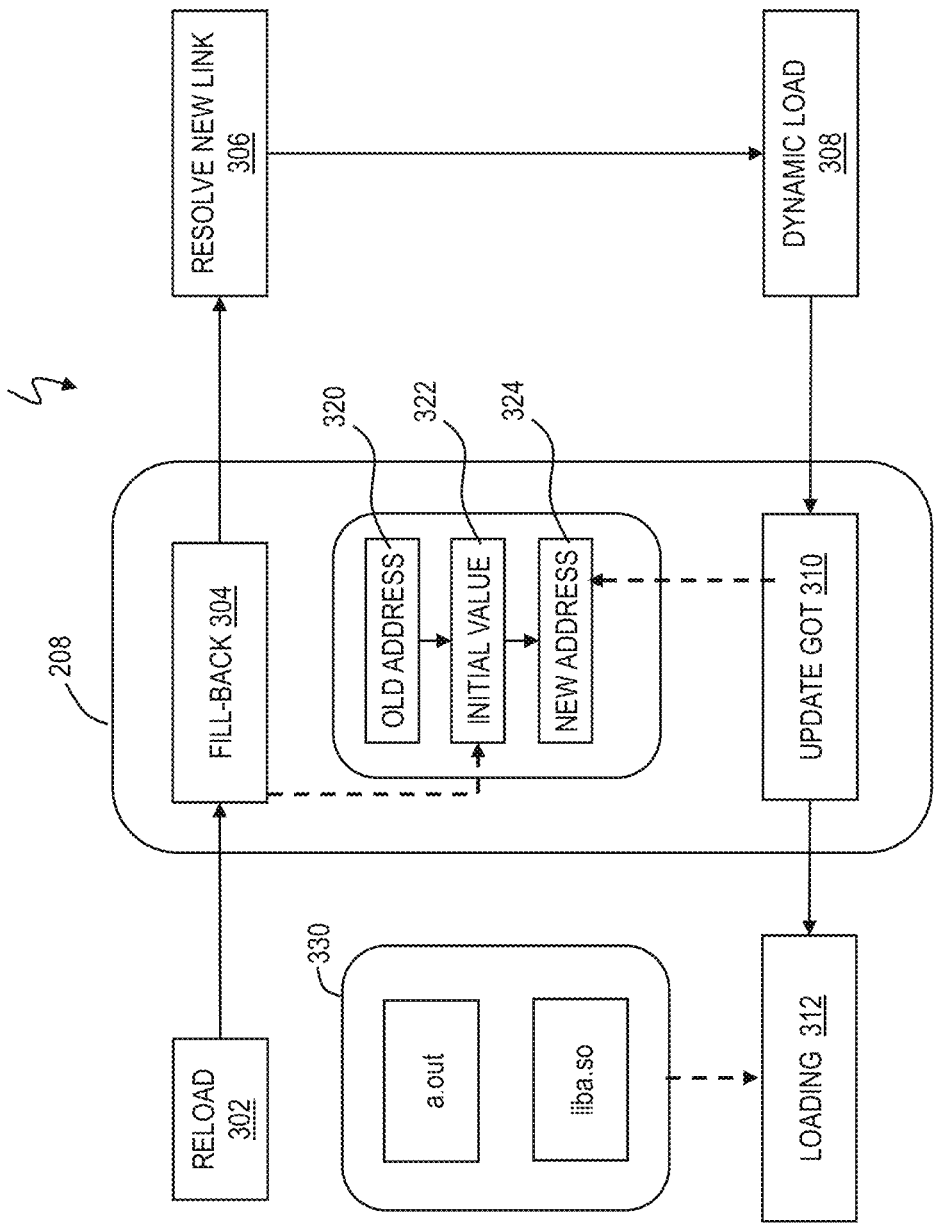
FIG. 3 depicts a block diagram of an example architectural flow in accordance with one or more embodiments of the present invention.

FIG. 3 is a block diagram of an example architectural flow 300 in accordance with one or more embodiments of the present invention. The architectural flow 300 will be described with reference to FIG. 2. As noted above, software program/application 230 is executing on computer system 202 and shared library 214 is subsequently updated and reloaded, without stopping or halting execution of software program/application 230. At block 302, debugger 240 is configured to start a debugging session for software program/application 230 and during the debugging session, debugger 240 is configured to issue a reload command such as, for example, reload liba.so, thereby reloading shared library 214 because shared library 214 has been updated. When executing software program/application 230, debugger 240 is configured to invoke and/or communicate with software (APIs) respectively associated with each of static linker 210, dynamic linker 212, GOT 208, and shared library 214 to perform as discussed herein.

Block 304 is configured to start/perform GOT 208 fill back by resetting the address previously resolved for shared library 214 (e.g., for liba.so). For example, a given GOT entry in GOT table 208, old address 320 has been previously resolved in a link address field (e.g., link address field 504 depicted in FIG. 5) of GOT 208 for shared library 214. The old address 320 was previously resolved by dynamic linker 212. Because shared library 214 is reloaded/updated, GOT 208 is configured to reset old address 320 to an initial value 322 in link address field 504 depicted in FIG. 5. The initial value is predefined in advance as a default value. Additionally, as will be seen herein, performing GOT fill back not only includes resetting the link address from the old address (originally linked to) to the initial value (i.e., default value) but also includes resetting the GOT resolved flag from TRUE to FALSE (e.g., in resolved flag field 508 depicted in FIG. 5).

At block 306, dynamic linker 212 is invoked again (i.e., later) to resolve the new address for shared library 214 (e.g., liba.so) because shared library 214 has been updated. At block 308, dynamic linker 212 is configured to perform a dynamic load. When a symbol (e.g., function foo) defined in dynamic library (e.g., liba.so) is called in the first time after updated liba.so is reloaded, dynamic linker 212 performs resolution of an unresolved (relocated) entry by searching the unresolved entry table 215 and symbol table 216 for a match to the new address 324. For the unresolved entry found in unresolved entry table 215, dynamic linker 212 searches for and retrieves the symbol in a symbol table 216 used to resolve the new address for shared library 214 (liba.so). Using the symbol table 216, dynamic linker 212 works to resolve the symbol for shared library 214 (liba.so). Once the symbol is resolved, dynamic linker 212 updates an entry (for the resolved symbol) in index table 218 associated with shared library 214. At block 310, dynamic linker 212 is configured to update GOT 208 with the new address 324 (i.e., new value for the link address field 504 depicted in FIG. 5) that has been resolved. Also, dynamic linker 212 sets the GOT resolved flag from FALSE to TRUE (e.g., in resolved flag field 508 depicted in FIG. 5).

Figure 4:
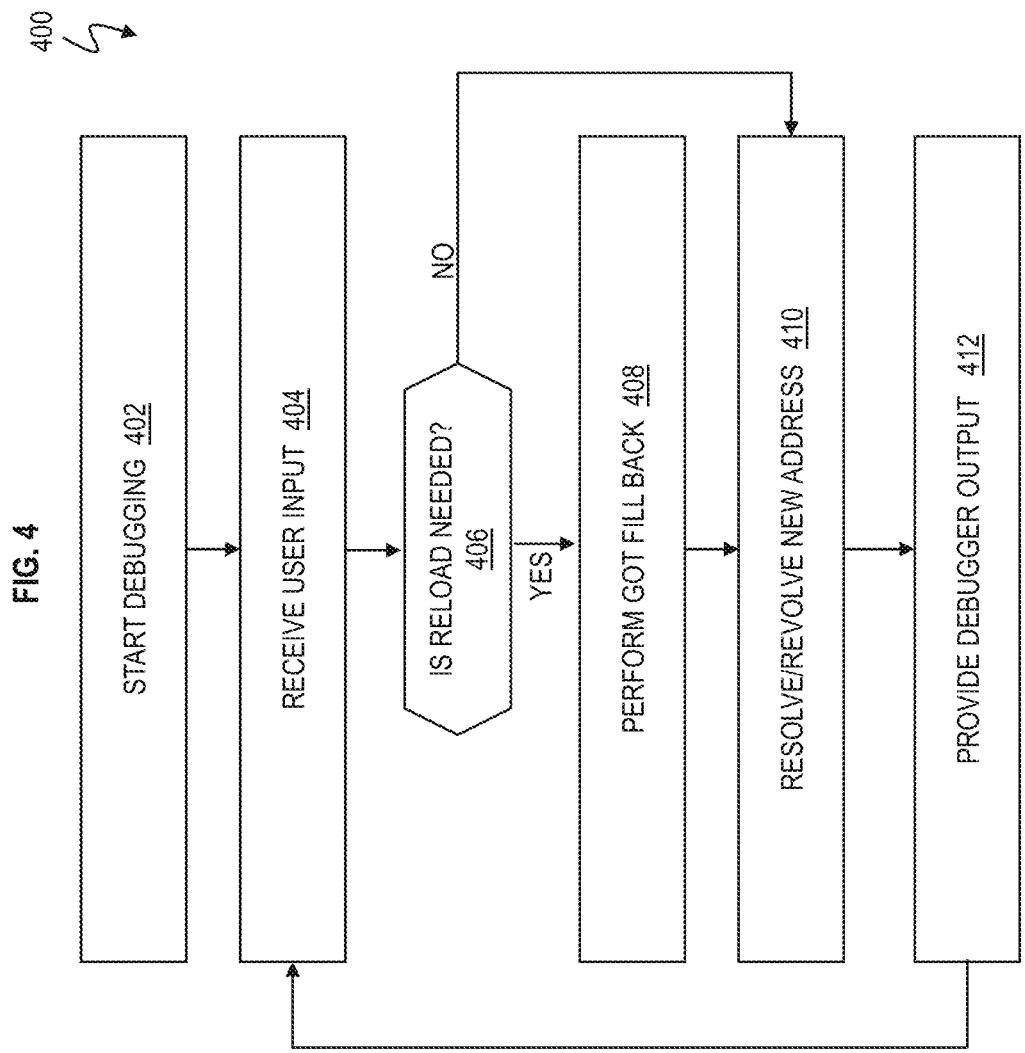
FIG. 4 depicts a block diagram of an example flowchart of a debugging session for software program/application in accordance with one or more embodiments of the present invention.

At block 312, dynamic linker 212 (or loader) is configured to load the newly resolved address of shared library 214 in a memory space for use by software program/application 230. Memory space can be one or more locations in memory 206 used by software program/application 230, one or more registers 250 for processors (such as processors 101), etc. Example result of the debugger 240 and/or the dynamic linker 212 can be input 330. Input 330 can include a library file name (e.g., liba.so) in shared library 214 and/or another output file (e.g., a.out). FIG. 4 is a block diagram of an example flowchart 400 of a debugging session for software program/application 230 in accordance with one or more embodiments of the present invention. As noted above, software program/application 230 is executing on computer system 202, and shared library 214 will be subsequently updated and reloaded. At block 402, debugger 240 is configured to start the debugging session for software program/application 230. At block 404, debugger 240 is configured to receive user input. User input could be authorization to continue debugging, to specify a particular section of code in software program/application 230 to examine, etc. For example, a command "reload liba.so" could be input by the user. At block 406, debugger 240 is configured to check if a reload of shared library 214 is needed. When no reload is needed, flow moves to block 410. When shared library 214 has been updated such as when one or more memory addresses have been changed (e.g., a new address replaces a previous address in shared library 214), debugger 240 determines that a reload of shared library 214 is needed for the changes/updates to take effect. In one example, debugger 240 may receive a trigger or instruction that shared library 214 should be reloaded to memory 206.

At block 408, debugger 240 is configured to perform GOT fill back and/or cause GOT fill back to be performed. Particularly, during GOT fill back, debugger 240 and/or another software tool is configured to fill back the GOT entry in GOT 208 corresponding to the address (or symbol) that has been updated, and accordingly, GOT 208 is reset with an initial value 322 (e.g., an initial value of 0x80000000 as the default value). In one or more embodiments, debugger 240 may include a GOT fill back module 242 and/or other tools can include GOT fill back module 242. GOT fill back module 242 includes computer-executable instructions configured to perform the GOT fill back discussed herein. In one or more embodiments, GOT fill back module 242 may be integrated with dynamic linker 212, GOT 208, and/or other software tools. At block 410, debugger 240 is configured to resolve the new address and/or cause dynamic linker 212 to resolve the new address. The process of loading is triggered to resolve the unresolved address (which is the new address) for the shared library 214 that has been reloaded. Resolving the new address is discussed at blocks 306 and 308 in FIG. 3. At block 412, debugger 240 is configured to provide debugger output. The debugger 240 will output the results according to the user request, e.g., which source line will be stopped after executing debug command "continue", "next", etc. The debugger session terminates whenever the user exits the debugger program, for example, according to user input at block 404.

Figure 5:
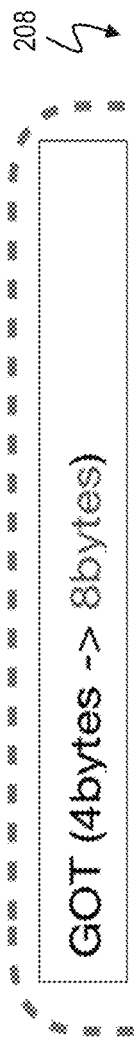
FIG. 5 depicts an example global offset table with extended fields in accordance with one or more embodiments of the present invention.

To perform the GOT fill back, one or more embodiments present a new GOT 208 (i.e., a new global offset table) as discussed in FIG. 5. As seen in FIG. 5, example GOT 208 includes three columns. The offset 502 depicts which GOT item is used to store the link address of symbol defined in dynamic library. For example, the offset can start at 0x00, and each GOT item or entry (e.g., row) has 8 bytes in this example. The first column depicts the link address field 504, which is the item value containing the resolved link address for the GOT item/entry in GOT 208. GOT 208 is extended to include two new columns, which are the second and third columns according to one or more embodiments of the invention. For the extended GOT fields, static linker 210 extends the size of the GOT item or entry from, for example, 4 bytes to 8 bytes and introduces two new fields in the extended 4 bytes: dynamic library (DLL) index field and resolved flag field. The second column depicts the DLL index field 506 of the linked module (i.e., the shared library 214) once resolved. The third column depicts the resolved flag field 508, which indicates if the module address (i.e., link address) is resolved or not. By default, the resolved flag is set to "FALSE" and is set to "TRUE" when the symbol address (of software program/application 230) is resolved by the loader (e.g., dynamic linker 212).

Figure 6:
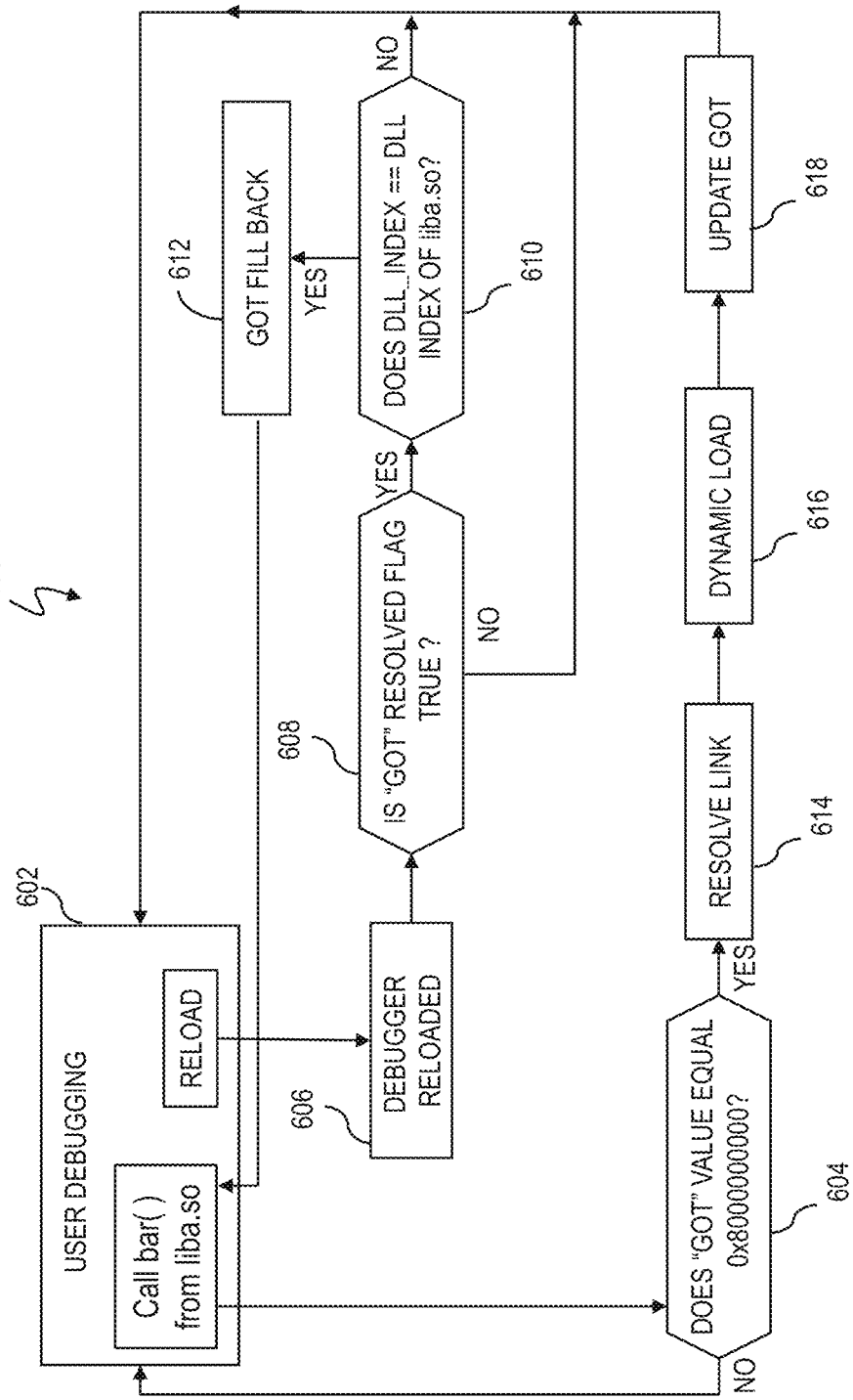
FIG. 6 depicts an example architectural flow in accordance with one or more embodiments of the present invention.

FIG. 6 is an example architectural flow 600 with further details of GOT fill back in accordance with one or more embodiments of the present invention. As discussed herein, software program/application 230 is executing on computer system 202 (e.g., during a debugging session), and shared library 214 is subsequently updated and reloaded. At block 602, debugging or testing of software program/application 230 is started via debugger 240. During the debugging session, code of software program/application 230 can include a function to call shared library 214, for example, such as the function bar( ) which is defined in liba.so. At block 604, debugger 240 (e.g., using GOT fill back module 242) is configured to check if the GOT entry or item in GOT 208 associated with the call by the function is equal to an initial value for the memory address. An example initial value (e.g., initial value 322) of the memory address (i.e., the link address in GOT 208) could be 0x80000000. If the memory address for the called GOT entry or item in GOT 208 is not the initial value, flow returns to block 602. If the memory address for the called GOT entry or item in GOT 208 is the initial value, flow proceeds to block 614 which will be discussed further below.

As noted herein, a memory address in shared library 214 has been updated and/or changed, after software program/application 230 previously started executing. Debugger 240 has started the debugging session and has be notified/informed of the update/change to shared library 214, for example, when shared library 214 is called. For example, a debugger command, for example, "reload liba.so", informs debugger 240 that liba.so needs to be reloaded. Accordingly, without halting and/or restarting software program/application 230, debugger 240 is configured to reload the updated shared library 214 (e.g., liba.so) and GOT 208 at block 606. At block 608, debugger 240 is configured to check whether GOT resolved flag in resolved flag field 508 is TRUE for the GOT entry or item. For example, using GOT 208, debugger 240 can check the resolved flag field 508 for the GOT entry/item (i.e., the row). When the GOT resolved flag is FALSE for the GOT entry/item, flow proceeds to block 602. When the GOT resolved flag is TRUE for the GOT entry/item, debugger 240 is configured to check whether the value of the DLL index in the DLL index field 506 for the GOT entry/item in GOT 208 is equal to value of the DLL index for the corresponding entry/item in DLL index table 218 in shared library 214 (e.g., liba.so) at block 610. When the value of the DLL index field 506 for the GOT entry/item in GOT 208 is not equal to value of the corresponding entry/item for the DLL index in DLL index table 218 of shared library 214 (e.g., liba.so), flow returns to block 602. When the value of the DLL index field 506 for the GOT entry/item in GOT 208 is equal to the value for the corresponding entry/item in the DLL index of DLL index table 218 in shared library 214 (e.g., liba.so), debugger 240 is configured to perform GOT fill back at block 612. As noted herein, the old link address (e.g., old address 320) in the link address field 504 was previously resolved using dynamic linker 212 prior to updating corresponding memory address in shared library 214. Because shared library 214 is reloaded/updated, debugger 240 is configured to reset the link address in the link address field for the GOT entry/item of GOT 208 (e.g., to reset old address 320 to an initial value 322, such as 0x8000000) and reset the GOT resolved flag in the resolved flag field to FALSE (as noted above for block 304).

Flow returns to block 602 in which debugger 240 is configured to again perform the call bar( ) to liba.so (shared library 214 which has now been updated). Returning to block 604, debugger 240 is configured to check if the GOT entry or item associated with the call by the function (e.g., call bar( )) is set to an initial value for the memory address (i.e., link address in GOT 208). When the memory address (e.g., link address in link address field 504 of FIG. 5) for the called GOT entry or item in GOT 208 is the initial value (e.g., initial value 322), debugger 240 instructs or causes dynamic linker 212 to resolve the new link address at block 614. At block 616, dynamic linker 212 (e.g., as caused by debugger 240) is configured to perform dynamic load (e.g., as discussed above at block 308). Dynamic linker 212 searches for a match to the new address 324 in an unresolved (relocated) entry table 215 in order to find the unresolved entry. For the unresolved entry found in unresolved entry table 215, dynamic linker 212 searches for and retrieves the symbol in a symbol table 216 used to resolve the new address for shared library 214 (liba.so). Using the symbol table 216, dynamic linker 212 works to resolve the symbol for shared library 214 (liba.so). Once the symbol is resolved, dynamic linker 212 updates an entry (for the resolved symbol) in index table 218 associated with shared library 214. At block 310, debugger 240 is configured to update GOT 208 with the new address 324 (i.e., new value for the link address field 504 depicted in FIG. 5) that has been resolved. Also, debugger 240 can setting the GOT resolved flag from FALSE to TRUE. At block 618, debugger 240 is configured to update GOT 208 and/or cause dynamic linker 212 to update GOT 208. During the update to the GOT entry or item in GOT 208, debugger 240 and/or dynamic linker 212 is configured to fill in the new resolved address as the link address of link address field 504, update the DLL index in the DLL index field 506, and mark the link address's resolved flag as TRUE in the resolved flag field 508.

Figure 7:
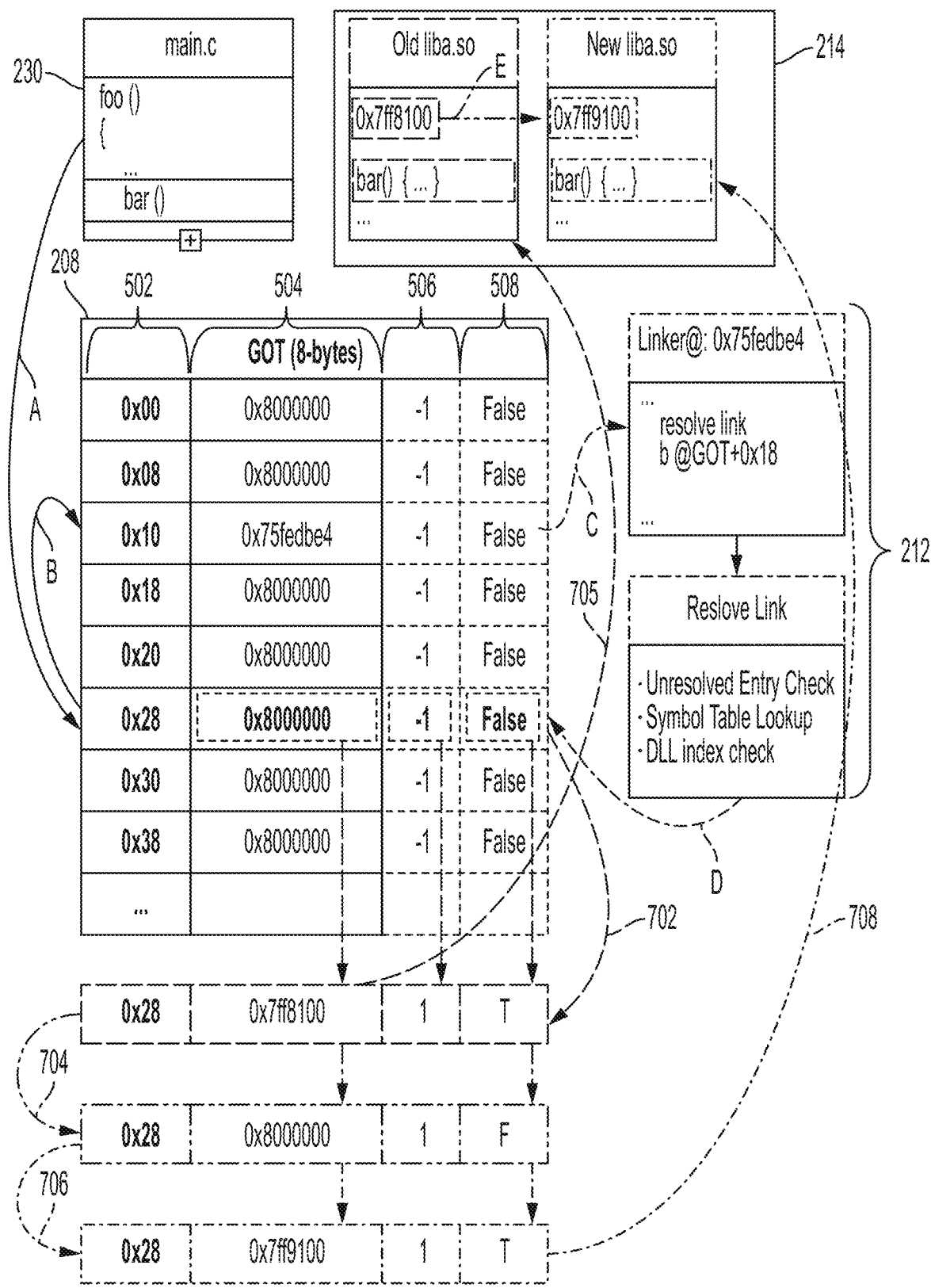
FIG. 7 depicts a block diagram illustrating detailed actions performed by a dynamic linker and debugger in accordance with one or more embodiments of the present invention.

For explanation purposes and not limitation, example scenarios are discussed in FIGS. 7-11. FIG. 7 is a block diagram depicting detailed actions performed by the dynamic linker and debugger according to one or more embodiments of the invention. Normally, reloading the shared library requires stopping the execution of the program/application. However, if a typical system attempts to continue execution of the program/application without stopping, the typical system would reload the recompiled shared library (e.g., liba.so) but the address of called function (e.g., bar( )) in the reloaded liba.so has changed from 0x7ff8100 (old shared library) to 0x7f19100 (updated shared library). Since the address stored in the GOT item is not the default value (i.e., not 0x80000000) in the typical system, the program/application branches to 0x7fTh100 which is the original (old) loading address of bar( ) and this will make reloading the shared library (e.g., liba.so) non-functional in the typical system. In FIG. 7, while using the extended GOT 208 (depicted in FIG. 5), one or more embodiments are configured to reload the shared library 214 without stopping the execution of the software program/application 230. Because shared library 214 has been updated, dynamic linker 212 is configured to assign "1" to the DLL index of DLL index field 506 and mark the address's resolved flag with TRUE in resolved flag field 508 of the GOT entry or item as depicted in action 702. Also, dynamic linker 212 assigns the resolved address of bar ( ) to 0x7fTh100 which is shown in the old version (e.g., old libra.so) of shared library 214, and it is noted that action 705 points to the old address (e.g., 0x7ff8100) of the shared library 214 at this moment. While software program/application 230 is running, shared library 214 is reloaded or recompiled. For example, debugger 240 invokes dynamic linker 212 (e.g., loader) to reload the updated shared library 214 (e.g., new liba.so) by issuing a command, for example "reload liba.so", after shared library 214 is recompiled. At action 704, debugger 240 gets all mapped GOT entries or items (i.e., GOT+0x28) by retrieving the GOT entry or item with DLL index "1" in DLL index field 506, and if the resolved flag is TRUE in resolved flag field 508, debugger 240 resets the link address (in link address field 504) stored in targeted GOT entry/item (e.g., GOT+0x28) with a default value (i.e., 0x80000000) and address resolved flag with FALSE. At action 706, dynamic linker 212 is configured to assign "1" to the DLL index field 506 and mark the address resolved flag as TRUE in resolved flag field 508 for the GOT entry/item, and then assign the resolved address of bar 0x7f19100 in link address field 504 when symbol bar is called again. The resolved address of bar (i.e., 0x7ff9100) is the link address to the updated shared library 214 (i.e., new liba.so) instead of the old shared library (e.g., old liba.so), and action 708 points/links to the updated shared library 214. It is noted that an example portion of software program/application 230 is shown in FIG. 7, and the example function (e.g., bar( )) is a call to the address of bar. It is noted that actions illustrating typical actions/transitions for sharing and dynamic libraries using PLT and GOT in FIGS. 7 and 8 (such as actions A-K) are not described because these actions/transitions are understood by one skilled in the art.

Figure 8:
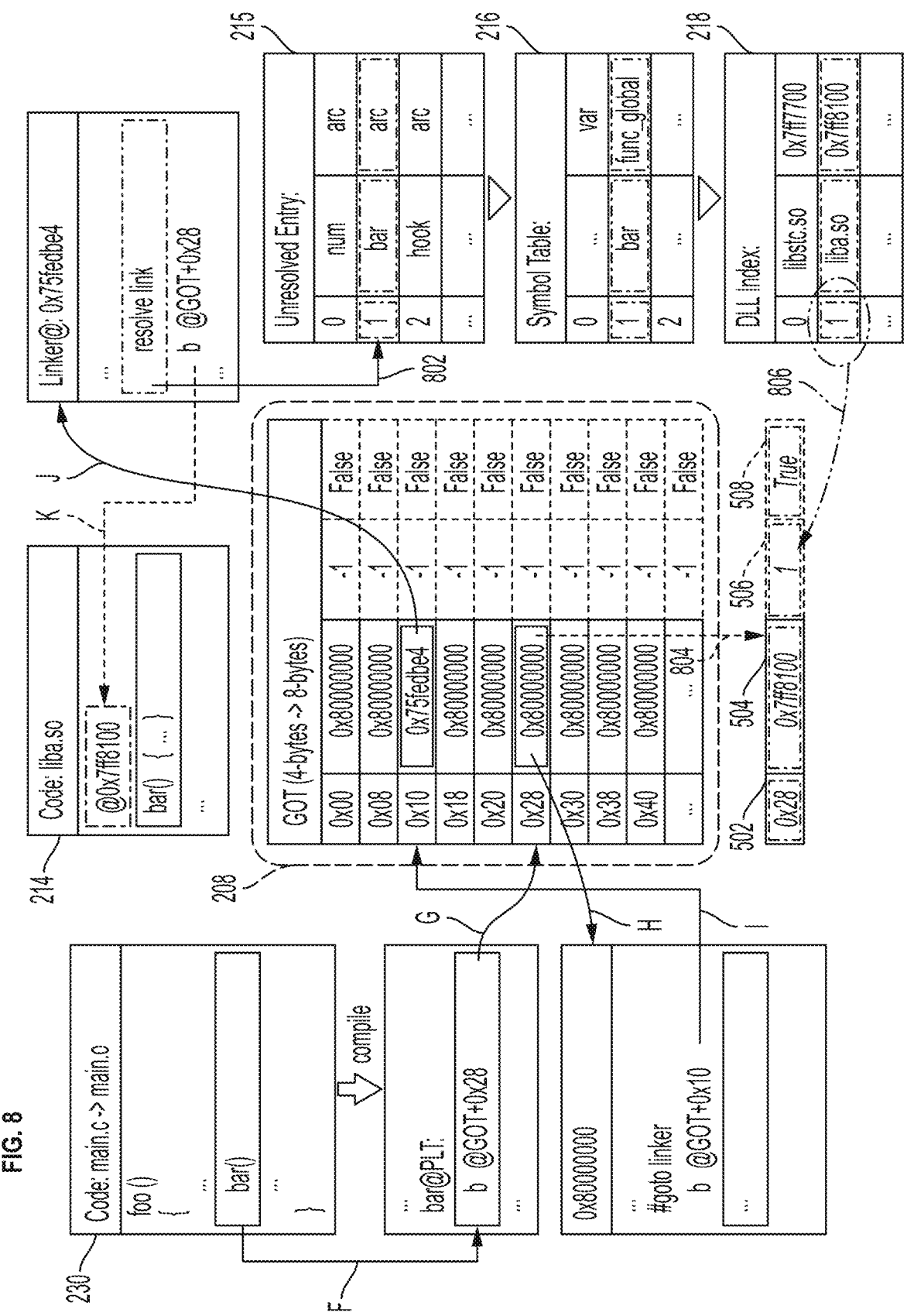
FIG. 8 depicts a block diagram illustrating linker actions in accordance with one or more embodiments of the present invention.

To provide further details regarding action 702 in FIG. 7, FIG. 8 is a block diagram depicting linker actions performed by the dynamic linker according to one or more embodiments of the invention. In FIG. 8, at action 802, dynamic linker 212 is configured to get the resolved address after loading shared library 214 (e.g., liba.so) and resolve the address of called function bar. At action 804, dynamic linker 212 is configured to update the content of GOT+0x28 (i.e., the GOT entry/item) for bar with 0x7fTh100 in link address field 504. At action 806, for the GOT entry/item, dynamic linker 212 is configured to assign "1" to the DLL index and mark address the resolved flag with TRUE in the DLL index field 506 and resolved flag field 508, respectively.

Figure 9:
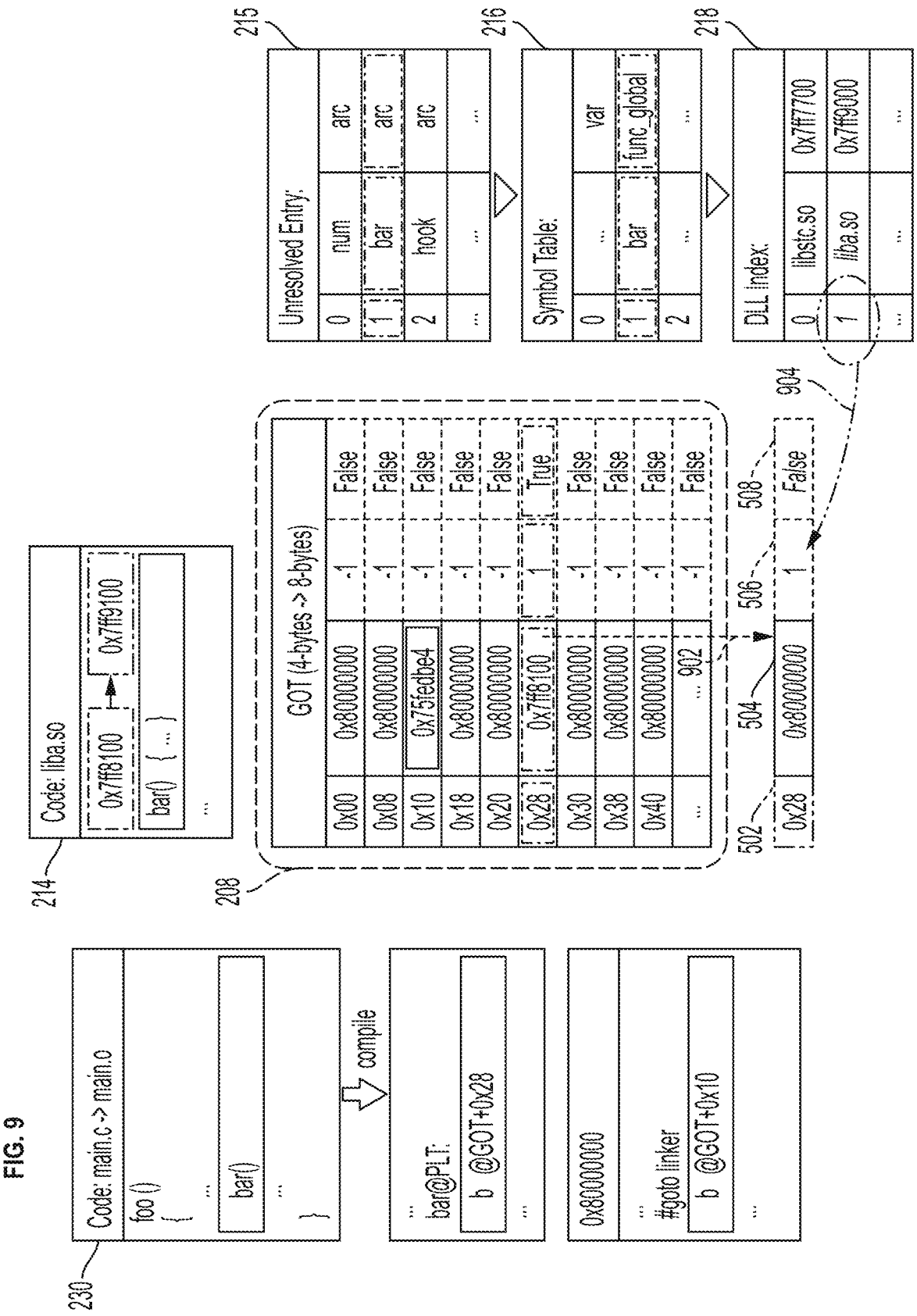
FIG. 9 depicts a block diagram illustrating fill back in accordance with one or more embodiments of the present invention.

Expanding upon FIGS. 7 and 8, FIG. 9 is a block diagram depicting GOT fill back according to one or more embodiments of the invention. As noted herein, debugger 240 invokes dynamic linker 212 (e.g., loader) to reload the updated shared library 214 (e.g., liba.so) by issuing a command (i.e., reload liba.so) after shared library 214 is recompiled, and dynamic linker 212 gets the DLL index by searching DLL index/table 218. At action 902, dynamic linker 212 gets all mapped GOT entries/items (i.e., GOT+0x28) by retrieving GOT entries/items with DLL index "1" in their respective DLL index field 506. If the resolved flag is TRUE for the GOT entry/item in GOT 208, fill back module 242 (e.g., block 304 in FIG. 3) resets the address stored in targeted GOT entry/item (e.g., GOT+0x28) with default value (i.e., 0x80000000) in link address field 506 and resets the address's resolved flag to FALSE in resolved flag field 508, at action 904 in FIG. 9.

Figure 10:
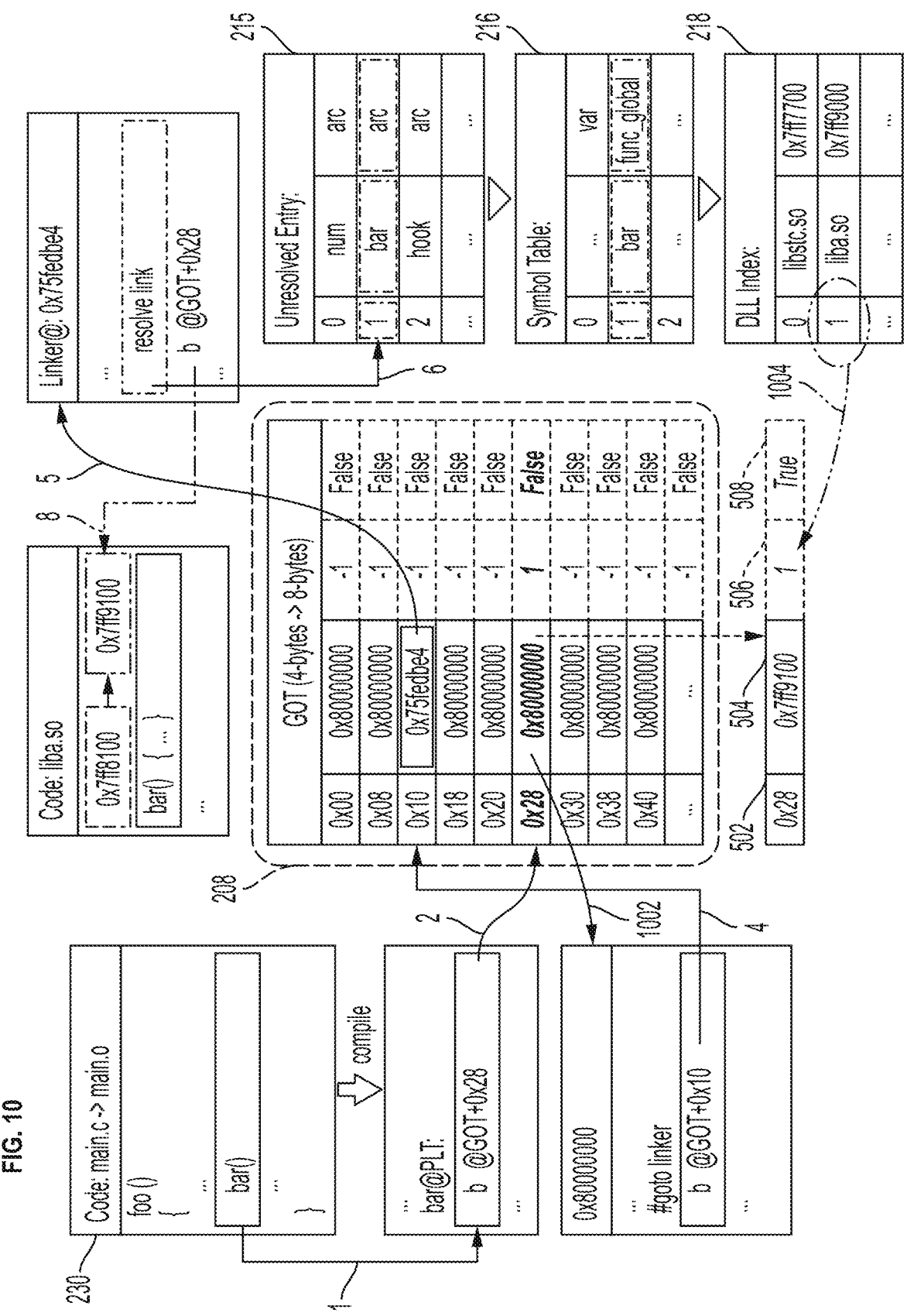
FIG. 10 depicts a block diagram illustrating further loader actions in accordance with one or more embodiments of the present invention.

To illustrate further use of GOT 208, FIG. 10 is a block diagram depicting further loader actions according to one or more embodiments of the invention. Dynamic linker 212 performs the address resolving process to update new address from recompiled shared library 214 as discussed herein. For example, at action 1002, dynamic linker 212 resolves the function bar address one more time if software program/application 230 calls bar ( ) again, because the address stored in GOT+0X28 is the default value 0x8000000. At action 1004, dynamic linker 212 updates the link address of GOT+0x28 with the new bar address 0x7ff910, assigns "1" to the DLL index, and marks the resolved flag as TRUE in the GOT entry/item. The old address (0x7fTh100) for the shared library 214 has been updated to the new address (i.e., new link address 0x7ff9100) in the GOT entry/item of GOT 208. The index field can be the value "–1" where "–1" is the initial value of library index field. The index field can be the value "1" which means the library index 218, i.e., the library index of liba.so is 1.

To illustrate using the updated GOT 208 and PTL, FIG. 11 is a block diagram that depicts branching directly to the new address (e.g., new address 324 in link address field 504) when the function is subsequently called according to one or more embodiments of the invention. At action 1102, software program/application 230 is compiled and PLT is used to redirect position-independent function calls to absolute locations. At action 1104, instruction "b @GOT+0X28" will jump to 0x7f19100 directly when bar ( ) is called again (later) since the value stored in GOT+0X28 is the new address 0x7ff9100.

Technical advantages and benefits include one or more embodiments that continue execution of the software program/application and/or the debugging process when dynamic libraries are updated, i.e., without stopping the software program/application or the debugging process. By not having to stop, halt, or pause, execution of the software program/application, performance is not impacted because additional instruction generation is not required by the static linker and extra action is not taken by the dynamic linker (e.g., loader), according to one or more embodiments. Further technical advantages and benefits include the reduction of time and effort for software programmers during development/testing of the software programs/application sand during location of the root cause, especially for complicated scenarios, all while providing the software programmer a more flexible method for testing and debugging.

Figure 12:
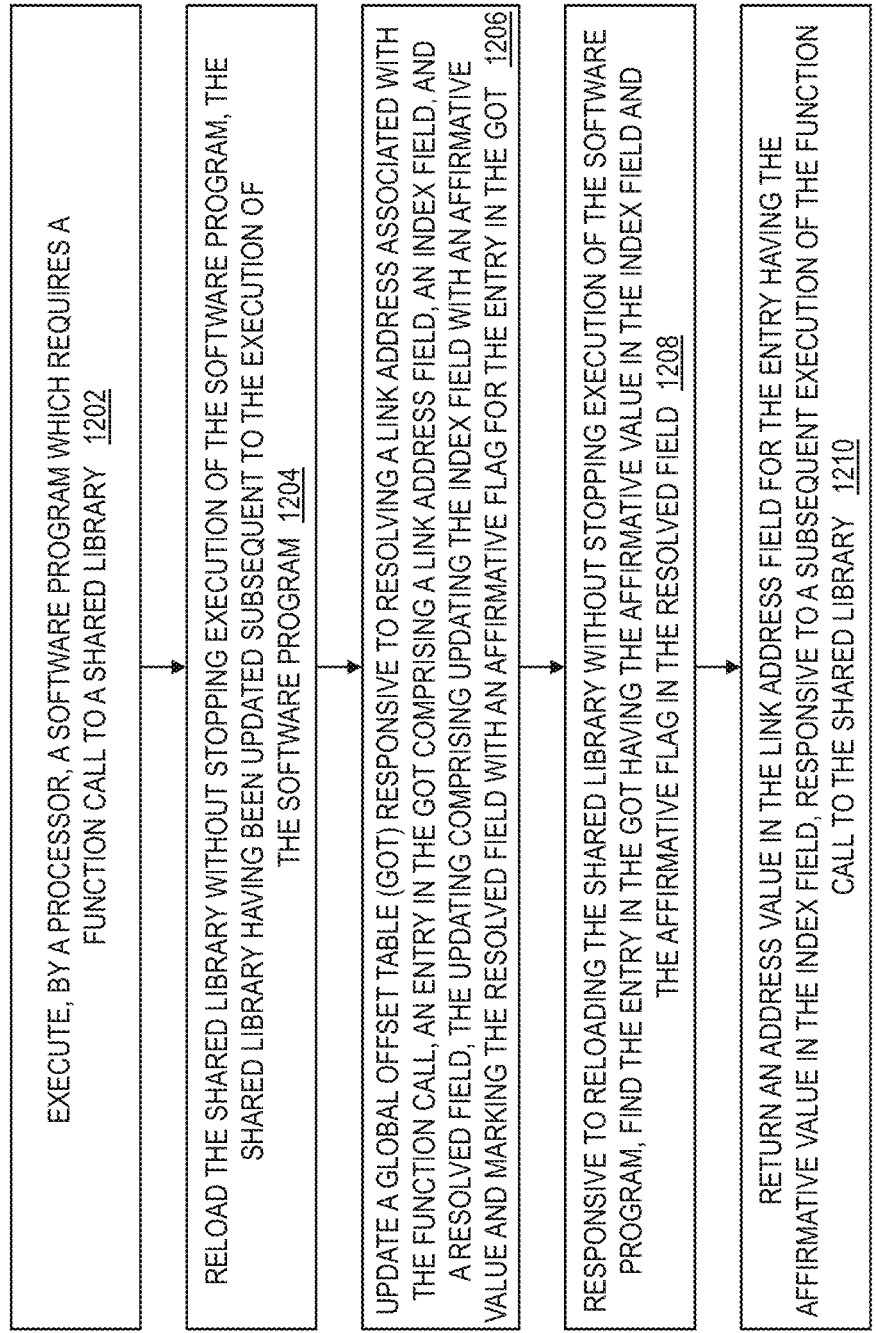
FIG. 12 is a flow chart of a method for performing updated shared library reloading without stopping execution of a software program/application in accordance with one or more embodiments of the present invention.

FIG. 12 is a flow chart of a method 1200 for performing updated shared library reloading without stopping the execution of software program/application 230 in accordance with one or more embodiments of the invention. At block 1202, debugger 240 via processor 101 is configured to execute a software program/application 230 which requires a function call (e.g., bar ( )) to a shared library 214 and/or cause software program/application 230 to be executed. At block 1204, debugger 240 is configured to and/or cause dynamic linker 212 to reload the shared library 214 without stopping execution of the software program/application 230, where the shared library 214 has been updated subsequent to the execution of the software program. At block 1206, debugger 240 is configured to update a global offset table (GOT) 208 responsive to resolving a link address associated with the function call, where an entry in the GOT 208 includes a link address field 504, an index field 506, and a resolved flag field 508, where the updating includes updating the index field with an affirmative value (e.g., "1") and marking the resolved field with an affirmative flag (e.g., TRUE) for the entry in the GOT 208. At block 1208, debugger 240 is configured to and/or cause dynamic linker 212 to, responsive to reloading the shared library 214 without stopping execution of the software program/application 230, find the entry in the GOT 208 having the affirmative value (e.g., "1") in the index field and the affirmative flag (e.g., TRUE) in the resolved field. At block 1210, debugger 240 is configured to and/or cause dynamic linker 212 to return an address value in the link address field for the entry having the affirmative value in the index field, responsive to a subsequent execution of the function call to the shared library 214.

Prior to updating the GOT 208, the link address field is set to a default value (e.g., 0x80000000). Prior to updating the GOT 208, the resolved field is marked with a non-affirmative value (e.g., FALSE) if the resolved field previously contained the affirmative value (e.g., TRUE). The reloading of the shared library 214 without stopping execution of the software program/application 230 includes resolving a new address (e.g., 0x7f19100) for the shared library 214 having been updated. The updating of the GOT 208 includes replacing the default value with the new address in the link address field after resolving the new address. The address value in the link address field is the new address having been resolved for the shared library 214. The shared library 214 is initially/previously loaded for the function call to the shared library during the executing of the software program/application 230, prior to the reloading of the shared library 214.

Figure 13:
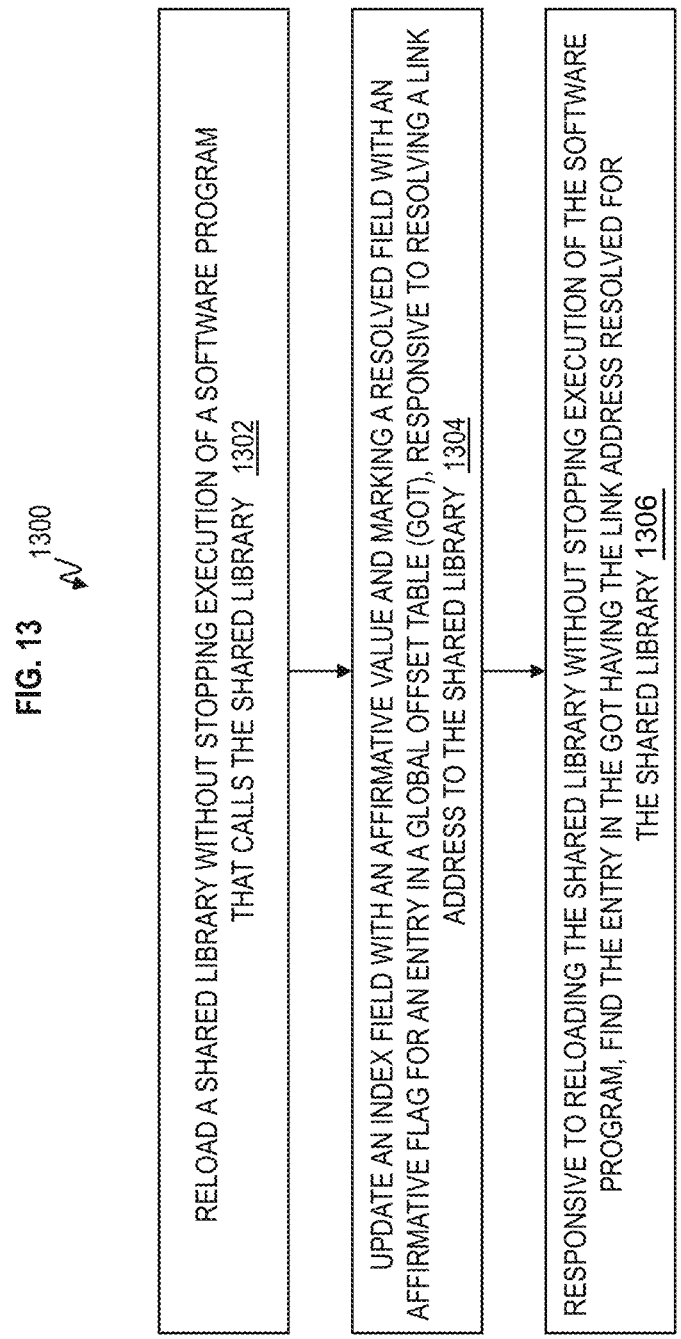
FIG. 13 is a flow chart of a method for performing updated shared library reloading without stopping the execution of software program/application in accordance with one or more embodiments of the invention.

FIG. 13 is a flow chart of a method 1300 for performing updated shared library reloading without stopping the execution of software program/application 230 in accordance with one or more embodiments of the invention. At block 1302, debugger 240 is configured to and/or cause dynamic linker 212 to reload a shared library 214 without stopping execution of a software program/application 230 that calls the shared library 214. At block 1304, debugger 240 is configured to update an index field (e.g., DLL index field 506) with an affirmative value (e.g., "1") and mark a resolved field (e.g., resolved flag field 508) with an affirmative flag (e.g., TRUE) for an entry in a global offset table (GOT), responsive to resolving a link address (e.g., for link address field 504) to the shared library 214. At block 1306, debugger 240 is configured to, responsive to reloading the shared library without stopping execution of the software program, find the entry in the GOT 208 having the link address resolved for the shared library 214.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 14:
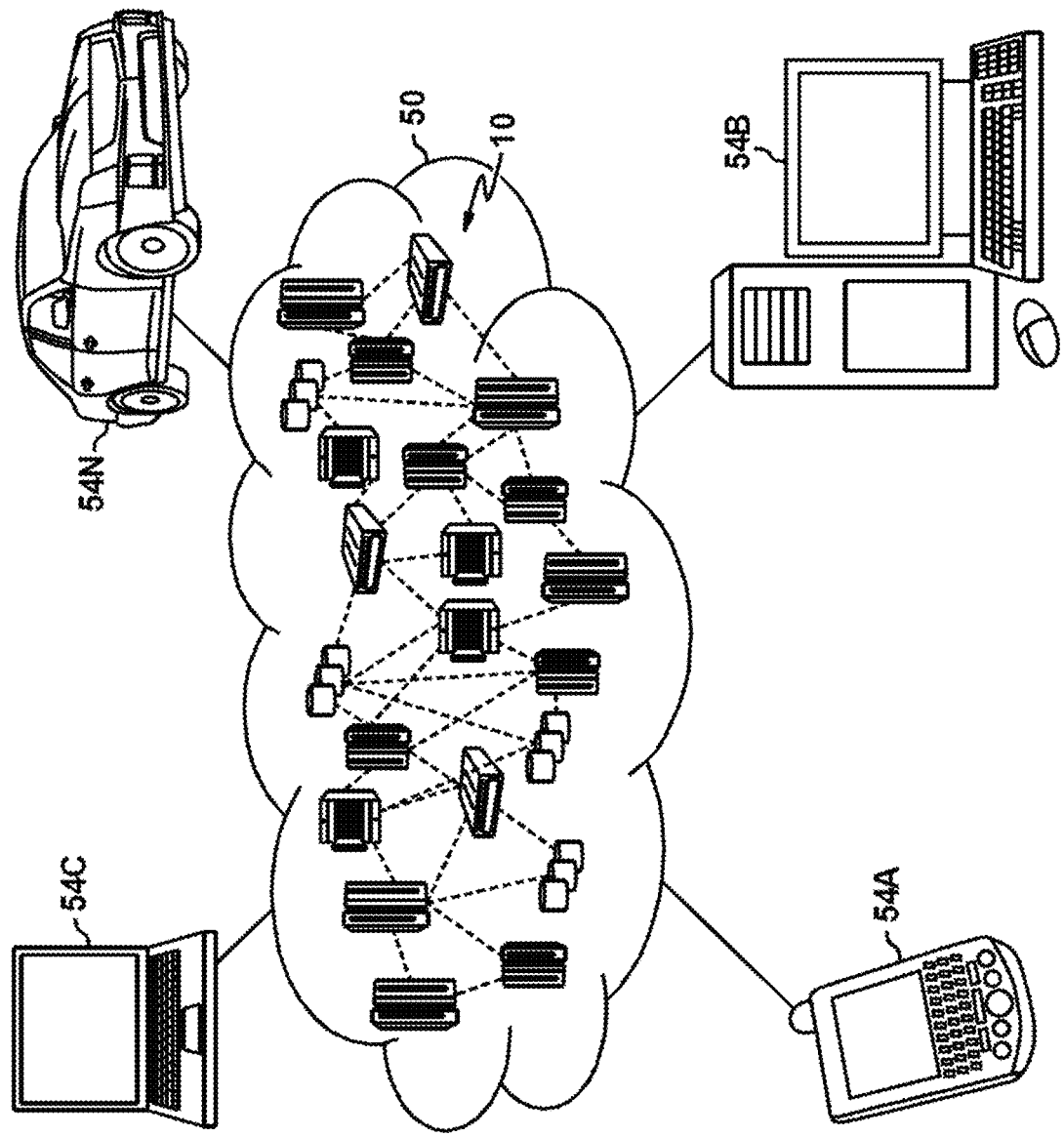
FIG. 14 depicts a cloud computing environment according to one or more embodiments of the present invention.

Referring now to FIG. 14, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 14 are intended to be illustrative only and that computing nodes 10 and cloud computing environment 50 can communicate with any type of computerized device over any type of network and/or network addressable connection (e.g., using a web browser).

Figure 15:
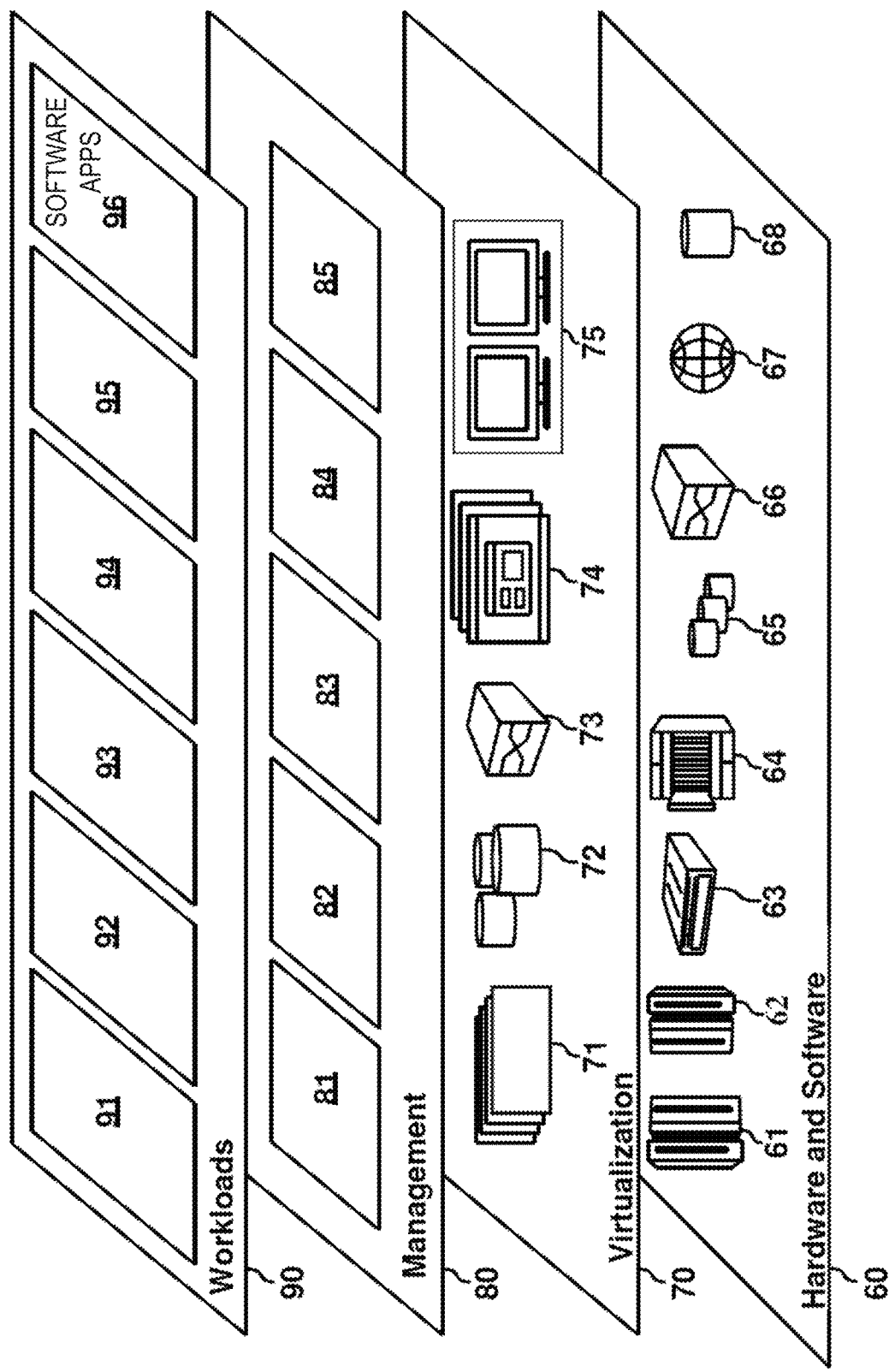
FIG. 15 depicts abstraction model layers according to one or more embodiments of the present invention.

Referring now to FIG. 15, a set of functional abstraction layers provided by cloud computing environment 50 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications 96 (e.g., software program/application 230, debugger 240, static linker 210, dynamic linker 212, and fill back module 242). Also, software applications can function with and/or be integrated with Resource provisioning 81.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   executing, by a processor, a software program which requires a function call to a shared library;
   reloading the shared library without stopping execution of the software program, the shared library having been updated subsequent to the execution of the software program;
   updating a global offset table (GOT) responsive to resolving a link address associated with the function call, an entry in the GOT comprising a link address field, an index field, and a resolved field, the updating comprising updating the index field with an affirmative value and marking the resolved field with an affirmative flag for the entry in the GOT;
   responsive to reloading the shared library without stopping the execution of the software program, finding the entry in the GOT having the affirmative value in the index field and the affirmative flag in the resolved field; and
   returning an address value in the link address field for the entry having the affirmative value in the index field, responsive to a subsequent execution of the function call to the shared library.

2. The computer-implemented method of claim 1, further comprising, prior to updating the GOT, setting the link address field to a default value.

3. The computer-implemented method of claim 1, further comprising, prior to updating the GOT, marking the resolved field with a non-affirmative value if the resolved field previously contained the affirmative value.

4. The computer-implemented method of claim 1, wherein the reloading of the shared library without stopping execution of the software program comprises resolving a new address for the shared library having been updated.

5. The computer-implemented method of claim 4, wherein the updating of the GOT comprises replacing a default value with the new address in the link address field.

6. The computer-implemented method of claim 4, wherein the address value in the link address field is the new address having been resolved for the shared library.

7. The computer-implemented method of claim 1, wherein the shared library is initially loaded for the function call to the shared library during the executing of the software program, prior to the reloading of the shared library.

8. A system comprising:
a memory having computer readable instructions; and
one or more processors for executing the computer readable instructions, the computer readable instructions controlling the one or more processors to perform operations comprising:
  executing a software program which requires a function call to a shared library;
  reloading the shared library without stopping execution of the software program, the shared library having been updated subsequent to the execution of the software program;
  updating a global offset table (GOT) responsive to resolving a link address associated with the function call, an entry in the GOT comprising a link address field, an index field, and a resolved field, the updating comprising updating the index field with an affirmative value and marking the resolved field with an affirmative flag for the entry in the GOT;
  responsive to reloading the shared library without stopping execution of the software program, finding the entry in the GOT having the affirmative value in the index field and the affirmative flag in the resolved field; and
  returning an address value in the link address field for the entry having the affirmative value in the index field, responsive to a subsequent execution of the function call to the shared library.

9. The system of claim 8, further comprising, prior to updating the GOT, setting the link address field to a default value.

10. The system of claim 8, further comprising, prior to updating the GOT, marking the resolved field with a non-affirmative value if the resolved field previously contained the affirmative value.

11. The system of claim 8, wherein the reloading of the shared library without stopping execution of the software program comprises resolving a new address for the shared library having been updated.

12. The system of claim 11, wherein the updating of the GOT comprises replacing a default value with the new address in the link address field.

13. The system of claim 11, wherein the address value in the link address field is the new address having been resolved for the shared library.

14. The system of claim 8, wherein the shared library is initially loaded for the function call to the shared library during the executing of the software program, prior to the reloading of the shared library.

15. A computer program product comprising a computer readable storage medium having program instructions embodied therewith, the program instructions executable by a processor to cause the processor to perform operations comprising:
  executing a software program which requires a function call to a shared library;
  reloading the shared library without stopping execution of the software program, the shared library having been updated subsequent to the execution of the software program;
  updating a global offset table (GOT) responsive to resolving a link address associated with the function call, an entry in the GOT comprising a link address field, an index field, and a resolved field, the updating comprising updating the index field with an affirmative value and marking the resolved field with an affirmative flag for the entry in the GOT;
  responsive to reloading the shared library without stopping execution of the software program, finding the entry in the GOT having the affirmative value in the index field and the affirmative flag in the resolved field; and
  returning an address value in the link address field for the entry having the affirmative value in the index field, responsive to a subsequent execution of the function call to the shared library.

16. The computer program product of claim 15, further comprising, prior to updating the GOT, setting the link address field to a default value.

17. The computer program product of claim 15, further comprising, prior to updating the GOT, marking the resolved field with a non-affirmative value if the resolved field previously contained the affirmative value.

18. The computer program product of claim 15, wherein the reloading of the shared library without stopping execution of the software program comprises resolving a new address for the shared library having been updated.

19. The computer program product of claim 18, wherein the updating of the GOT comprises replacing a default value with the new address in the link address field.

20. The computer program product of claim 18, wherein the address value in the link address field is the new address having been resolved for the shared library.

21. A computer-implemented method comprising:
  reloading a shared library without stopping execution of a software program that calls the shared library;
  updating an index field with an affirmative value and marking a resolved field with an affirmative flag for an entry in a global offset table (GOT), responsive to resolving a link address to the shared library; and
  responsive to reloading the shared library without stopping execution of the software program, finding the entry in the GOT having the link address resolved for the shared library.

22. The computer-implemented method of claim 21, wherein the finding the entry in the GOT having the link address resolved for the shared library is responsive to a subsequent execution of a call to the shared library.

23. The computer-implemented method of claim 21, further comprising, prior to the updating the index field with the affirmative value and marking the resolved field with the affirmative flag for the entry in the GOT, marking the resolved field with a non-affirmative value if the resolved field previously contained the affirmative value.

24. A system comprising:
a memory having computer readable instructions; and
one or more processors for executing the computer readable instructions, the computer readable instructions controlling the one or more processors to perform operations comprising:
  reloading a shared library without stopping execution of a software program that calls the shared library;
  updating an index field with an affirmative value and marking a resolved field with an affirmative flag for an entry in a global offset table (GOT), responsive to resolving a link address to the shared library; and
  responsive to reloading the shared library without stopping execution of the software program, finding the entry in the GOT having the link address resolved for the shared library.

25. The system of claim 24, wherein the finding the entry in the GOT having the link address resolved for the shared library is responsive to a subsequent execution of a call to the shared library.

* * * * *